May 20, 1924.

L. SCHMIDT

ENGRAVING APPARATUS

Filed July 25, 1921   3 Sheets-Sheet 1

1,494,377

Inventor.
Ludwig Schmidt
By Elliott & Hansen
Attorneys

May 20, 1924.
L. SCHMIDT
ENGRAVING APPARATUS
Filed July 25, 1921   3 Sheets-Sheet 2
1,494,377
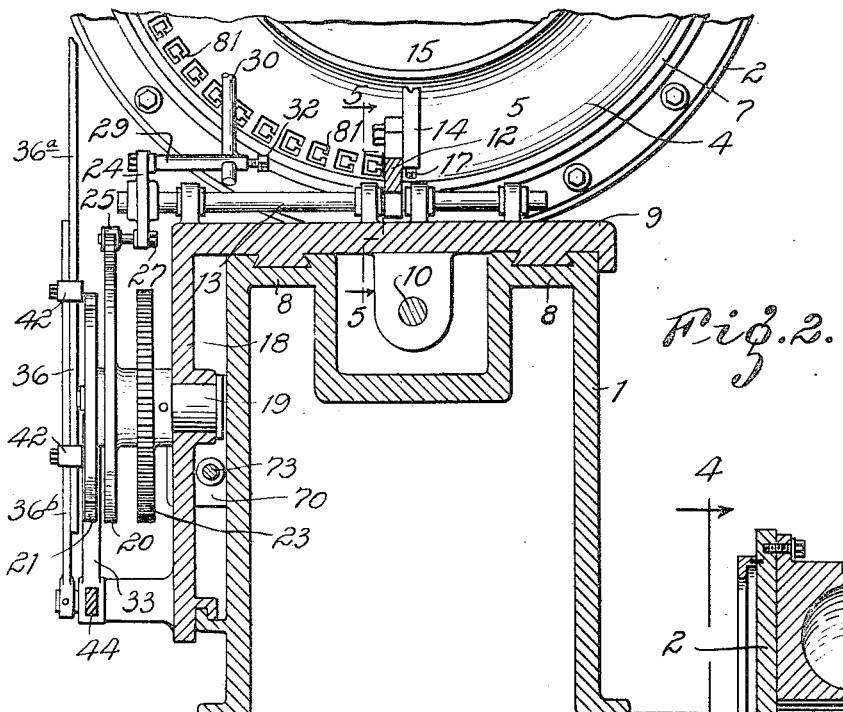
Fig. 2.
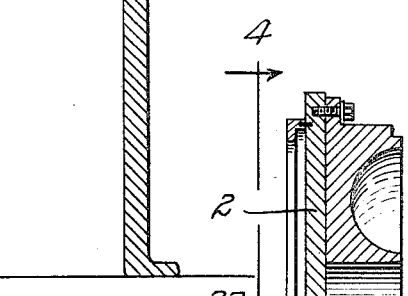
Fig. 3.
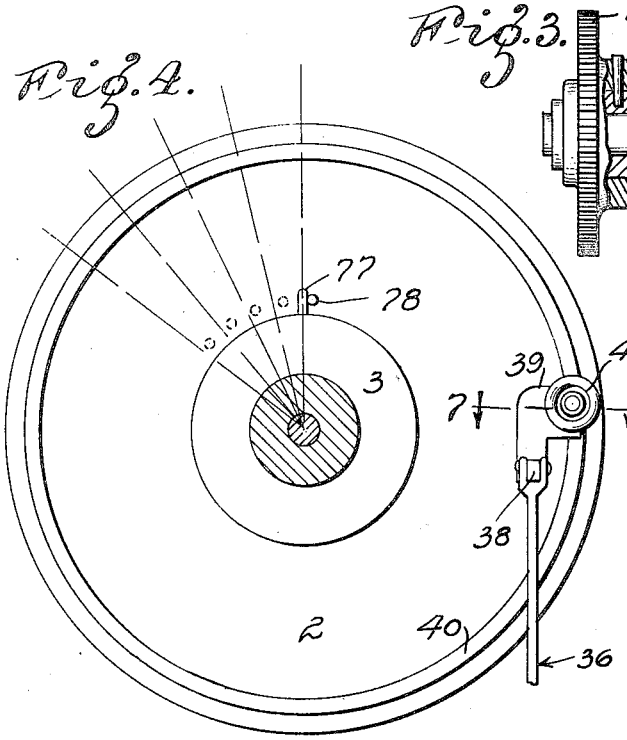
Fig. 4.
Inventor:
Ludwig Schmidt
By Elliott & Ammen
Attorneys
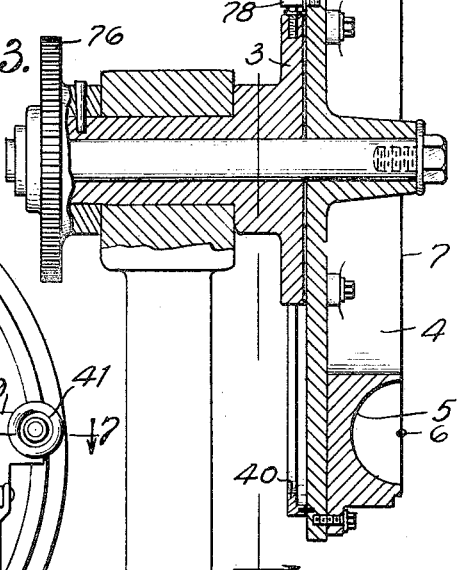

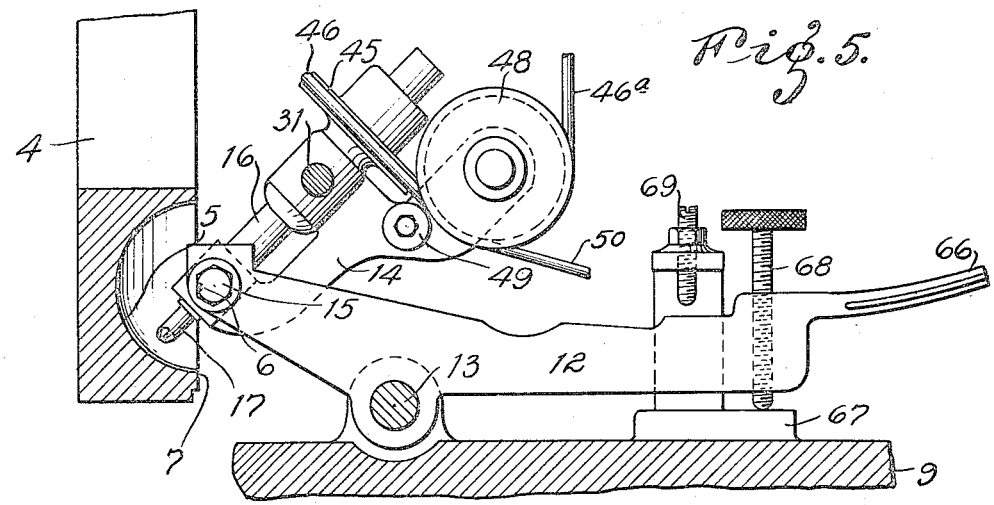
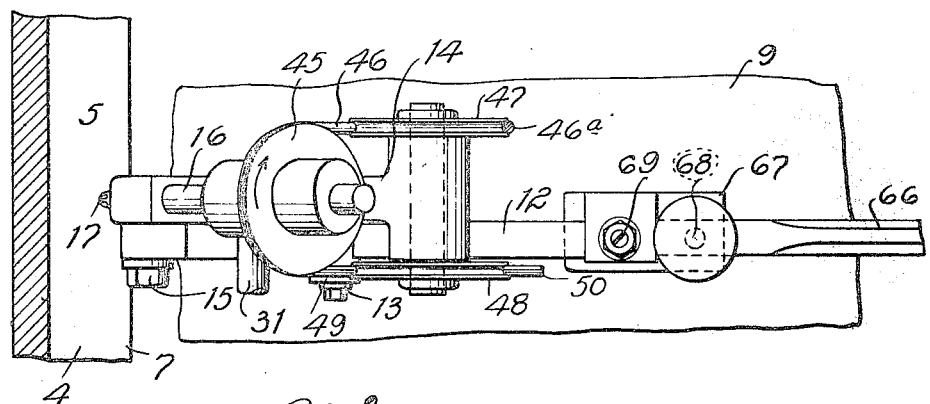
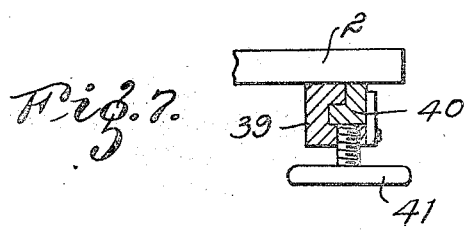

Patented May 20, 1924.

1,494,377

UNITED STATES PATENT OFFICE.

LUDWIG SCHMIDT, OF ST. LOUIS, MISSOURI, ASSIGNOR TO ESSMUELLER MILL FURNISHING COMPANY, OF ST. LOUIS, MISSOURI, A CORPORATION OF MISSOURI.

ENGRAVING APPARATUS.

Application filed July 25, 1921. Serial No. 487,237.

*To all whom it may concern:*

Be it known that I, LUDWIG SCHMIDT, a citizen of the United States, residing in the city of St. Louis and State of Missouri, have invented new and useful Improvements in Engraving Apparatus, of which the following is a specification.

This invention relates to apparatus for engraving molds and while features of the invention may be applied in the engraving of molds for various purposes, in the present specification I have described the invention as applied to the engraving of tire molds so as to facilitate the production of tires with distinctive characters on the treads. The general object of the invention is to produce simple means for engraving surfaces of revolution and also to provide simple engraving apparatus which is so constructed as to enable it to be readily modified to produce different kinds of engraved characters in the mold. In one aspect of the invention it may be regarded as a special adaptation of a gear cutting machine to the purposes of the invention. That is to say, I may employ the usual indexing apparatus of a gear cutter, which carries the gear and which moves it through a predetermined angle after each tooth space is cut in the face of the gear. With this indexing apparatus I combine a special engraving mechanism which controls the movement of the engraving tool and also produces a special movement of the face plate which carries the mold. In this way characters may be cut in the face of the mold.

Further objects of the invention will appear hereinafter.

In the drawings,

Figure 2 is a vertical section taken about on the line 2—2 of Figure 1;

Figure 3 is a vertical section taken through the face plate and indexing head of the machine, certain parts being broken away and shown in elevation;

Figure 4 is a cross section taken on the line 4—4 of Figure 3 and particularly illustrating the mode of operation of the indexing head and its co-operating parts. This view is on a more reduced scale than Figure 3;

Figure 5 is a vertical section of the machine taken about on the line 5—5 of Figure 2 and particularly illustrating the means for mounting and driving the cutting tool;

Figure 6 is a plan of the parts shown in Figure 5 with the mold shown in developed section;

Figure 7 is a cross section through a clamp taken about on the line 7—7 of Figure 4.

Figure 1:
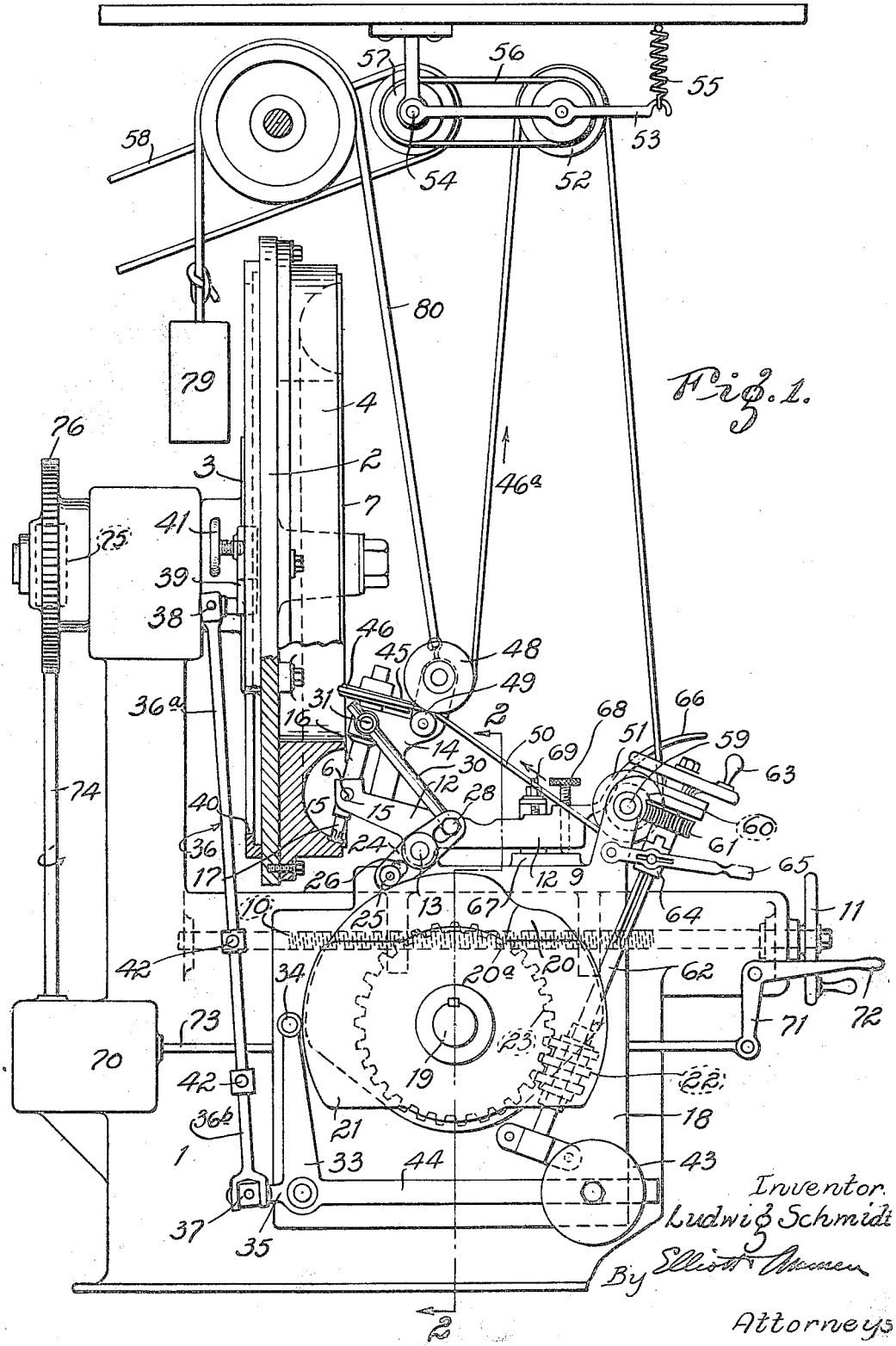
Figure 1 is a side elevation of a machine embodying my invention; in this view certain parts are broken away and shown in cross section.

Before proceeding to a detailed description of the apparatus I desire to say that the invention is particularly applicable to machines for engraving surfaces of revolution and more especially to such a surface where the cross section of the article is also curved or circular. In using the apparatus I support the cutting tool with its cutting end disposed adjacent to the surface to be engraved, and move the tool forward so as to cause its cutting end to penetrate the surface or face to be engraved. By moving the tool laterally and by producing a relative rotary movement of the tool and the mold with respect to each other I cause the tool to cut the desired figure or character. By reason of the fact that the surface being engraved is a surface of revolution this relative rotation of the article being engraved and the tool does not increase the depth of the engraved line or cut.

Where the article has a curved or circular cross section, as in a tire mold the engraving tool should be mounted to rotate about an axis near the mold, and this axis should substantially coincide with the axis of transverse curvature of the mold. Hence when the tool is moved on this transverse axis it moves laterally into the face of the mold but without substantially changing the depth of the cut. Of course, by varying the position of the transverse rocking axis of the tool the depth of the cut may be varied so that its depth would decrease in a certain direction.

I shall now describe the embodiment of apparatus which enables the engraving operation to be effected in this way. In the drawing, 1 represents a frame or housing of any suitable construction. In the present instance this is the housing of a gear cutting machine of a common type. In machines of this type the blank gear which is to be cut is attached to a vertical face plate and while the face plate is held fixed a milling cutter moves across the face of the gear and cuts the tooth space. In order to transform this machine into an engraving machine I remove the usual face plate and substitute a special face plate 2 which is loosely mounted on the axis of an index head 3 (see Figure ?). Along the outer side of this face plate the work or blank tire mold is rigidly secured. In this connection it should be understood, of course, that the mold 4 in practice will co-operate with a similar mold so as to form a complete annular tire mold. Its surface or face 5 is, of course, a surface of revolution and in the present instance the cross section of the mold is of circular or semi-circular form. With the axis of transverse curvature 6 located on the meeting face 7 of the mold. The housing 1 is formed above into a guide-way 8 for a carriage 9 (see Figure 2), and this carriage may be adjusted at will toward or from the mold 4 through the operation of a screw 10, the outer end of which carries a hand wheel 11 (see Fig. 1). It will be seen that the face plate 2 constitutes means for rotatably supporting the mold 4 so that it may be rotated on the axis of revolution of the mold surface 5. On the carriage 9 I support a rotary tool spindle extending toward the face 5 of the mold which is to be engraved, and this tool spindle carries a cutting tool adjacent to the face of the mold; I also provide means for pivotally supporting the spindle to rotate on a transverse axis near the mold. Means is provided for rotating the spindle on its longitudinal axis to drive the tool. When an engraving operation begins the tool is advanced until it penetrates the face of the mold, and I rock the tool on an axis to move the cutting point in one direction and automatically rotate the mold to give a relative movement of the surface with respect to the axis of revolution of the mold. I prefer to control the movements of the tool and the mold by means of cams because this enables me to substitute cams of different designs, thereby enabling characters of different shapes to be cut in the face of the mold. It is obvious that the character of the cams will determine the character of the figure that will be engraved by the tool. By way of example, I have described two cams which will co-operate to engrave a "C" in the face of the mold.

On the carriage I mount a movable bracket 12 which is mounted to rock on a pivot 13, the axis of which is parallel to the plane of the face plate 2. On the forward end of this bracket a tool frame 14 is mounted to rock on a pivotal support provided by a pivot pin 15, the axis of which is also parallel to the plane of the face plate 2, and during the engraving operation the axis of this pin lies very near the axis of curvature 6 of the cross sectional surface 5 of the mold. In the tool frame 14 a tool spindle 16 is rotatably mounted, which extends toward the mold and adjacent the mold carries a rotary engraving tool or cutter 17. I provide means for rocking the tool frame 14 on the pin 15 to enable the cutter or tool 17 to cut laterally by its own motion and I also provide means for rotating the face plate 2 as may be desired, so that the two movements will produce the proper shape for the character or figure which is to be cut in the mold. To enable this to be accomplished the carriage 9 is provided with a vertical apron 18 carrying a horizontal cam shaft 19. This cam shaft carries a tool-controlling cam 20 and a mold-controlling cam 21, and these cams may be rotated simultaneously through the rotation of a worm 22 which meshes with a worm-wheel 23 rigidly secured to the cam shaft 19. I provide means for actuating the tool frame 14 to rock it as may be necessary to produce the desired character, and this actuating means should include an adjustable connection which enables the amount of movement to be regulated. For this purpose I provide a small rock lever 24 on the rocking pin 13 and one arm of this lever carries a roller 25 which rolls on the edge of the cam 20. This roller may be secured at any desired position along the slot 26 by means of a clamping nut 27 (see Figure 2). The other arm of the lever 24 has a pin-and-slot connection 28 with a swivel post 29 and this post carries an adjustable connecting rod 30 which extends up and is attached by a swivel pin 31 to the side of the tool frame 14. The connecting rod 30 slides freely through the post 29 but may be clamped in any desired position by a small set screw 32 (see Figure 2).

I provide means for actuating the face plate 2 from the cam 21 and this means includes a disconnectible connection which may be disconnected at will to permit the face plate 2 to be rotated freely when desired. For this purpose I provide a cam lever 33 of bell-crank form carrying a roller 34 which rests on the edge of the cam and carrying a short arm 35 to which an extensible link 36 is attached by a universal joint 37. The upper end of the extensible link 36 is connected by a suitable joint 38 to a clamp 39 and this clamp is constructed to engage in an undercut groove in an annular guide-way 40 disposed on the back of the face plate 2 (see Figures 1 and 4). The clamp may be tightened up at will by means of a small hand wheel 41. The link 36 may be adjusted as to length because it is formed in two sections 36ᵃ and 36ᵇ (see Figure 2) which overlap each other and may be secured together by clamps 42. The roller 34 is held up against the cam 21 by a counter weight 43 on a horizontal arm 44 of the bell crank lever 33. I provide a flexible connection for driving the tool spindle and, if desired, this flexible driving mechanism may also operate to drive the worm 22. The flexibility of this connection is necessary to enable the tool spindle 16 to be driven in any position that it may assume during the engraving operation.

The tool spindle 16 carries a rigid driving pulley 45 for a round belt 46. This belt has an upwardly moving run 46ᵃ which is guided under a vertical guide pulley 47 (see Fig. 6) after coming around on the upper edge of the guide pulley 45. The belt 46 is guided onto the edge of the pulley 45 by passing between two guide pulleys 48 and 49 to which it comes on an inclined run 50 after forming a loop in the belt which passes around a pulley 51 mounted at the rear of the carriage 9. The belt passes down to the pulley 51 from an overhead driving pulley 52 which is mounted on a frame 53 which may swing down on the axis of a pin or shaft 54, being always pulled upwardly by a spring 55. The pulley 52 is driven through a short belt 56 from a pulley 57 mounted on the shaft 54. The pulley 57 is driven through a belt 58, and a clutch, not illustrated.

The shaft 59 that carries the pulley 51 also carries a worm 60 which meshes with a worm wheel 61 carried on a shaft 62 which carries the worm 22. On the upper end of the shaft 62 a hand wheel 63 is provided for rotating the worm 22 by hand when a clutch 64 is opened, the said clutch being disposed on the shaft 62 and controllable by means of a clutch lever 65. In other words the worm wheel 61 is loose on the shaft 62 but may be secured to it by closing the clutch.

I provide means for limiting the rocking movement of the bracket or rocker 12, and this rocking movement is utilized to enable the depth of the cut to be regulated. For this purpose the outer end of the rocker 12 is provided with a handle 66 which enables the bracket 12 to be rocked on the axis of its pivotal support 13. The manner of adjusting the depth of the cut will be clearly understood by an inspection of Figure 5. On the carriage 9 a boss 67 is provided, the upper face of which forms a seat for the end of an adjusting screw 68 which passes down through the rocker. The carriage is provided with another adjustable stop 69 which projects over the upper edge of the rocker 12 and limits the movement of the rocker in the other direction. It is evident that the adjusting screw 69 will determine the depth of the engraved cut while the said screw 68 may be adjusted into such a position as will enable the movement of the lever or rocker 12 to throw the tool out of the cut.

Standard machines of this type include indexing mechanism 70 (see Figure 1) including interchangeable gears which may be used to give any predetermined movement to the indexing head. This mechanism is controlled by an indexing lever 71. By depressing the handle 72 of this lever and returning it again to its normal position, motion is imparted by a link 73 which extends to the indexing mechanism 70, and this produces rotation of a vertical shaft 74 carrying a worm 75 which meshes with a worm wheel 76 which is rigidly attached to the indexing head 3 (see Figure 3). This will produce a predetermined angular rotation of the indexing head 3. In some machines this movement is automatically effected by power. The parts just referred to for effecting movement of the indexing head form no part of my invention and the means illustrated for this purpose is merely a conventional method for illustrating the means for effecting the indexing movement of the indexing head.

I provide means whereby the face plate 2 may be set into a definite relation with respect to the indexing head 3. The mode of operation of the machine in this respect is substantially as follows:

The indexing head having been put into a certain position, the face plate 2 is then rotated so as to give it a definite relation with respect to the indexing head. An engraving operation then takes place during which the face plate moves away from its position and eventually returns to its original position after the engraving operation is completed. The indexing head is then set further in advance, and the clamp 39 is then disconnected and the face plate also advanced into a new position determined by the indexing head. This will insure that the engraved characters or letters will be uniformly spaced around the mold and at the completion of the ring of characters the last character cut will fit perfectly in between the two adjacent characters. In other words, the indexing arrangement of the machine regarded as a gear cutter, operates to insure a uniform spacing of the engraved characters.

In order to carry out these operations the indexing head 3 is provided with a radially projecting indexing point or pin 77 which operates as a stop for a dog 78 secured to the rear side of the face plate (see Figures 3 and 4).

In the operation of the machine it is necessary to provide a counter weight 79, and cord 80 which is attached to the outer end of the tool frame 14. This insures that the cam roller 25 will always be held up against the cam 20.

It should also be understood that in starting the operation one of the cams should be provided with means for indicating when it is disposed in its starting position. This will usually be indicated naturally by the cam, for example, in the present instance, the cam 20 has a depression 20ª and this depression or dip corresponds to the starting point of the cam. In other words, when the engraving operation starts the dip 20ª should be located directly under the roller 25.

I shall now describe the mode of operation of the entire machine. The belt 46 produces the rotation of the tool spindle 16 on its longitudinal axis. By rotating the hand wheel 11 the machinist advances the carriage 9 into proper position, that is to say, to such a point as to bring the axis of the pin 15 substantially in alignment with the center or axis 6 of transverse curvature of the surface or face 5 of the mold which is to be engraved. The operator then pulls up on the handle 66 so as to rock the bracket or rocker 12 on the axis of the pin 13, and this will advance the cutter so that it will penetrate the face 5. The depth of the penetration can be regulated by adjusting the screw 69 downwardly (see Figure 5). When the proper depth of cut has been determined in this way the operator closes the clutch 65 and this starts the automatic operation of the machine. The cam 20 operating through the rocker 24 imparts movement to the tool frame 14 so that a lateral movement is imparted to the cutter 17. In order to enable the engraving operation to be very clearly understood I have selected a simple character such as the letter "C" for the character which is to be engraved on the mold. In cutting this character the tool would be started at the point 81 of the "C" (see Figure 2). As the wheel 25 runs up out of the dip 20ª the cutter 17 will be rocked so as to cut the vertical groove at this part of the letter. As soon as this vertical cut is completed the cam 20 permits the tool frame 14 to stand still and the cutting of the tool is then caused by the operation of the cam 21 which produces a rotation of the mold on its axis of revolution. That is to say, on the axis of the indexing head.

As soon as the outside horizontal bar of the "C" has been cut in this way, the cam 21 becomes inactive and the cam 20 rocks the tool frame 14 and causes the cutting of the back groove for the engraved letter. Then this cam becomes inactive and the cam 21 again rotates the mold to produce the opposite horizontal bar of the "C." Then this cam becomes inactive, and the cam 20 rocks the tool frame to produce the remaining front of the "C."

In this way the point of the tool describes or cuts the letter "C" in the face of the mold. The cams are preferably constructed of symmetrical form. This is desirable because it facilitates the taking of a double cut if desired, such a double cut may be necessary where the letters are to be very deep. In making such a double cut it would simply be necessary to stop the machine as soon as the letter has been completely formed and then operate the tool to produce a further penetration, and then start the machine up again. The relative movement of the tool and mold will then operate to cause the tool to follow along the groove already cut and finally return the tool to the original starting point 81 of the letter. Of course, in starting the cutting of the letter the dog 78 would be placed up against the side of the pin 77. As the engraving operation occurs the face plate would rotate toward the right so that the dog 78 will move away from the pin and eventually the dog 78 would return to the pin 77, that is to say, to its original position.

In Figure 4 I have illustrated radial lines which indicate the successive positions in which the pin 77 would be placed in successive engraving operations. After one of the lines has been cut the operator simply operates the indexing handle 72 and this shifts the pin 77 forward to the next position. The operator then unloosens the hand wheel 41 which releases the clamp 39 from the face plate 2. The face plate would then be rotated toward the left until the dog 78 is stopped by the pin 77. The clamp would then be tightened up after which the engraving operation would be repeated to form the next letter.

It is understood that the embodiment of the invention described herein is only one of the many embodiments my invention may take, and I do not wish to be limited in the practice of my invention nor in my claims, to the particular embodiment set forth.

What I claim is:

1. In a tire-mold engraving mechanism, the combination of means for supporting the mold to rotate on an axis, a cutting tool, means for pivotally supporting the same near the face of the mold, means for rotating the tool, hand-operated means for advancing the tool to enable it to penetrate the face of the mold, a cam, means actuated thereby for giving the tool a lateral movement after it has penetrated the face of the mold, and means for rotating the mold.

2. In a tire-mold engraving mechanism, the combination of means for supporting the mold to rotate on its axis, a rotary tool spindle extending toward the inner surface of the mold and carrying a cutting tool adjacent the face of the mold, means for pivotally supporting the spindle to rotate on a transverse axis near the mold, means for rotating the spindle on its longitudinal axis to drive the tool, a tool-controlling cam, means actuated thereby for rocking the spindle on its transverse pivotal support, a mold-controlling cam, and means actuated thereby for rotating the mold.

3. In a tire-mold engraving mechanism, the combination of means for supporting the mold to rotate on its axis, a movable bracket, a rotary too spinde extending toward the inner face of the mold and carrying a cutting tool adjacent the face of the mold, means for pivotally supporting the spindle to rotate on a transverse axis on the bracket near the mold, means for rotating the spindle on its longitudinal axis to drive the tool, a tool-controlling cam, means actuated thereby for rocking the spindle on its pivotal support, a mold-controlling cam, and means actuated thereby for rotating the mold, said movable bracket enabling the tool to be moved by hand at will into contact with the face of the mold.

4. In a tire-mold engraving mechanism, the combination of means for supporting the mold to rotate on its axis, a carriage mounted to move toward or from the mold, a rocker mounted to rock on the carriage, a rotary tool-spindle supported thereby extending toward the inner face of the mold and carrying a cutting tool adjacent the face of the mold, means for pivotally supporting the spindle to rotate on a transverse axis near the mold, means for rotating the spindle on its longitudinal axis to drive the tool, a tool-controlling cam, means actuated thereby for rocking the spindle on its pivotal support to cause the tool to cut the face of the mold, a mold-controlling cam, means actuated thereby for rotating the mold, and stops cooperating with the rocker for limiting the movement of the rocker when moved by hand to press the tool into the face of the mold and to withdraw the tool therefrom.

5. In a tire-mold engraving mechanism, the combination of means for supporting the mold to rotate on its axis, a tool frame, means for pivotally supporting the same near the mold, a rotary spindle mounted in the tool frame, means for rotating the same on its longitudinal axis to drive the tool, a tool-controlling cam, means actuated thereby for rocking the tool-frame on its pivotal support, a mold-controlling cam, and means actuated thereby for rotating the mold.

6. In a tire-mold engraving mechanism, the combination of means for supporting the mold to rotate on an axis, a rotary tool spindle carrying a cutting tool adjacent the face of the mold, a tool-frame rotatably supporting the spindle, means for pivotally supporting the tool-frame to rotate on a transverse axis, an overhead belt driving connection for driving the tool spindle in any position of the tool-frame, means actuated by the belt for rocking the tool-frame on the said transverse axis to give the tool a lateral movement, and automatic means for rotating the tire-mold.

7. In a tire-mold engraving mechanism, the combination of means for supporting the mold to rotate on an axis, a carriage guided to move toward and from the mold, a tool spindle extending toward the mold and carrying a cutting tool adjacent the mold, a tool frame supporting the tool spindle on the carriage so as to rotate on a transverse axis adjacent the mold, a tool-controlling cam, supported by the carriage, means actuated thereby for rocking the tool frame on the said transverse axis, a mold-controlling cam also supported on the carriage, means actuated thereby for rotating the mold, a flexibly supported driving belt for driving the tool spindle, and means driven by said belt for driving said cams.

8. In a tire-mold engraving mechanism, the combination of means for supporting the mold to rotate on an axis, a carriage guided to move toward and from the mold, a tool spindle extending toward the mold and carrying a cutting tool adjacent the mold, a tool-frame supporting the tool spindle on the carriage so as to rotate on a transverse axis adjacent the mold, a tool-controlling cam, supported by the carriage, means actuated thereby for rocking the tool-frame on the said transverse axis, a mold controlling cam also supported on the carriage, means actuated thereby for rotating the mold, a flexibly supported driving belt for driving the tool spindle, and means driven by the said belt for driving said cams, and hand-operated means for rotating the cams to set the same in their starting position.

9. In a tire-mold engraving mechanism, the combination of means for supporting the mold to rotate on an axis, a carriage guided to move toward and from the mold, a tool spindle extending toward the mold and carrying a cutting tool adjacent the mold, a tool-frame supporting the tool spindle on the carriage so as to rotate on a transverse axis adjacent the mold, a tool-controlling cam supported by the carriage, means actuated thereby for rocking the tool-frame on the said transverse axis, a mold-controlling cam also supported on the carriage, means actuated thereby for rotating the mold, a flexibly supported driving belt for driving the tool spindle, and means driven by the said belt for driving said cams, and means in the driving connection from the tool-controlling cam to the tool-frame for adjusting the amount of movement imparted to the tool-frame.

10. In a tire-mold engraving mechanism, the combination of a frame having a rotary indexing head, indexing mechanism for rotating said head through a predetermined angle, a face plate rotatably mounted on the axis of the indexing head, a rotary cutting tool, means for giving the tool a lateral movement while cutting the face of the mold, and means for rotating the face plate, said last named means including a connection constructed to be disconnected to permit the face plate to be set in a predetermined position with respect to the rotary head at the commencement of each engraving operation.

11. In a tire-mold engraving mechanism, the combination of a frame, a rotary indexing head mounted therein and carrying a stop, indexing mechanism for rotating said head through a predetermined angle after the completion of each engraving operation, a face plate rotatably mounted on the axis of the indexing head, a rotary cutting tool, means for giving the tool a lateral movement while cutting the face of the mold, said face plate having a dog to engage the said stop when the face plate is being set to commence an engraving operation, and means for rotating the face plate.

12. In a tire-mold engraving mechanism, the combination of a frame having a rotary indexing head, indexing mechanism for rotating said head through a predetermined angle after the completion of each engraving operation, a face plate rotatably mounted on the axis of the indexing head, having means to enable the same to be set in a predetermined position with respect to the indexing head, a rotary cutting tool, means for giving the tool a lateral movement while cutting the face of the mold, and means for rotating the face plate.

13. In a tire-mold engraving mechanism, the combination of a frame having a rotary indexing head, indexing mechanism for rotating said head through a predetermined angle, a face plate rotatably mounted on the axis of the indexing head, and having means to enable the same to be set in a predetermined position with reference to the indexing head, a rotary cutting tool, a tool-controlling cam, means actuated thereby for giving the tool a lateral movement while cutting the face of the mold, a mold-controlling cam, and means actuated thereby for moving the face plate on its axis.

14. In a tire-mold engraving mechanism, the combination of a frame having a rotary indexing head, indexing mechanism for rotating said head through a predetermined angle, a face plate rotatably mounted on the axis of the indexing head, and having means for setting the same in a predetermined position with relation to said indexing head, said face plate having an annular guide-way thereon, a clamp disconnectible at will and mounted in said guide-way, a mold-controlling cam, means actuated thereby and connected with said clamp for rotating the face plate, a rotary cutting tool, and means for giving the tool a lateral movement while cutting the face of the mold.

15. In mechanism of the character described, the combination of a rotatable work-holder, a rotary cutter-spindle oscillatory about a transverse axis, and means adapted to correlate rotative movement of said holder and oscillatory movement of said spindle.

16. In mechanism of the character described, the combination of a turntable adapted to support a tire-mold or like article, having an annular groove of curved cross-section to be engraved, a rotary cutter-spindle oscillatorily supported about a transverse axis approximately coincident with that of such cross-sectional curve, and means adapted to correlate rotative movement of said table and oscillatory movement of said spindle.

17. In a tire-mold engraving mechanism, the combination of means for supporting the mold to rotate on an axis, a cutting tool, a tool frame for pivotally supporting the same near the face of the mold, hand-operated means for advancing the tool to enable it to penetrate the face of the mold, a belt pulley on the tool-frame, an overhead belt drive for driving the belt pulley in any position of the tool-frame, means actuated by the belt drive, and connected to the tool-frame to rock the same and thereby give the tool a lateral movement after it has penetrated the face of the mold, and means for producing a relative rotary movement of the tool and the mold with respect to each other.

In testimony whereof, I have hereunto set my hand.

LUDWIG SCHMIDT.